US012143563B2

(12) United States Patent
Sireaev et al.

(10) Patent No.: US 12,143,563 B2
(45) Date of Patent: Nov. 12, 2024

(54) SCALING FACTOR DETECTION FOR COMPRESSED IMAGES AND VIDEOS

(71) Applicant: IMAX CORPORATION, Mississauga (CA)

(72) Inventors: Vladimir Sireaev, Waterloo (CA); Jiheng Wang, Waterloo (CA); Ahmed Badr, Waterloo (CA)

(73) Assignee: IMAX CORPORATION, Mississauga (CA)

( * ) Notice: Subject to any disclaimer, the term of this patent is extended or adjusted under 35 U.S.C. 154(b) by 499 days.

(21) Appl. No.: 17/355,645

(22) Filed: Jun. 23, 2021

(65) Prior Publication Data

US 2021/0400256 A1    Dec. 23, 2021

Related U.S. Application Data

(60) Provisional application No. 63/042,705, filed on Jun. 23, 2020.

(51) Int. Cl.
| | |
|---|---|
| *H04N 17/00* | (2006.01) |
| *H04N 19/154* | (2014.01) |
| *H04N 19/33* | (2014.01) |
| *H04N 19/587* | (2014.01) |
| *H04N 19/625* | (2014.01) |
| *H04N 21/234* | (2011.01) |

(52) U.S. Cl.
CPC ......... *H04N 17/004* (2013.01); *H04N 19/154* (2014.11); *H04N 19/33* (2014.11); *H04N 19/587* (2014.11); *H04N 19/625* (2014.11); *H04N 21/23418* (2013.01)

(58) Field of Classification Search
CPC .................................................... H04N 17/004
USPC ..................................................... 375/240.21
See application file for complete search history.

(56) References Cited

U.S. PATENT DOCUMENTS 5,339,108 A    8/1994   Coleman et al.
8,855,443 B2   10/2014  Knee
(Continued)

FOREIGN PATENT DOCUMENTS

| CN | 1798352 A | 7/2006 |
|---|---|---|
| JP | H1048149 A | 2/1998 |
| WO | 2018108330 A1 | 6/2018 |

OTHER PUBLICATIONS

Birajdar et al., "Blind Authentication of Resampled Images and Rescaling Factor Estimation", 2013 International Conference on Cloud & Ubiquitous Computing & Emerging Technologies, 2013, p. 112-116.

(Continued)

*Primary Examiner* — Yulin Sun
(74) *Attorney, Agent, or Firm* — Brooks Kushman P.C.

(57) ABSTRACT

Detection of scaling of compressed videos or images is provided. A frequency domain transformation is applied along both horizontal and vertical directions of input video or images to generate frequency domain data. Statistics in the frequency domain data are computed for each of the horizontal and vertical directions to extract features. The features are modeled to scores along each of the horizontal and vertical directions. An original resolution of the input video or images in the horizontal and vertical directions is identified according to the scores.

24 Claims, 9 Drawing Sheets

(56) References Cited

U.S. PATENT DOCUMENTS

| | | | |
|---|---|---|---|
| 2003/0190080 A1* | 10/2003 | Simard | G06T 9/004 |
| | | | 382/238 |
| 2019/0124342 A1* | 4/2019 | Young | H04N 19/129 |
| 2020/0021855 A1* | 1/2020 | Kuusela | H04N 19/13 |
| 2020/0186808 A1* | 6/2020 | Joshi | H04N 19/159 |
| 2021/0342701 A1* | 11/2021 | Ayush | G06F 18/2193 |

OTHER PUBLICATIONS

Mahdian et al., "Blind Authentication Using Periodic Properties of Interpolation", IEEE Transactions on Information Forensics and Security, Sep. 2008, p. 529-538, vol. 3, No. 3.

Prasad S. et al., "On Resampling Detection and its Application to Detect Image Tampering", IEEE International Conference on Multimedia and Expo, 2006, p. 1325-1328.

Singh et al., "Detection of Upscale-Crop and Splicing for Digital Video Authentication", Digital Investigation, 2017, p. 31-52, vol. 21.

\* cited by examiner

SCALING FACTOR DETECTION FOR COMPRESSED IMAGES AND VIDEOS

CROSS-REFERENCE TO RELATED APPLICATIONS

This application claims the benefit of U.S. provisional application Ser. No. 63/042,705 filed Jun. 23, 2020, the disclosure of which is hereby incorporated in its entirety by reference herein.

TECHNICAL FIELD

Aspects of the disclosure generally relate to automated detection of an original resolution from which a compressed video or a compressed image is scaled up.

BACKGROUND

Upscaling is a process by which lower-resolution content is converted into a higher-resolution format. Techniques for performing upscaling include nearest-neighbor interpolation (point sampling), bilinear interpolation, bicubic interpolation, and Lanczos interpolation. In some examples, a video may be streamed at a lower-resolution format, and upscaled to a higher-resolution format that is the native resolution of the display device.

SUMMARY

In one or more illustrative examples, a method for detecting scaling of compressed videos or images is provided. A frequency domain transformation is applied along both horizontal and vertical directions of input video or images to generate frequency domain data. Statistics in the frequency domain data are computed for each of the horizontal and vertical directions to extract features. The features are modeled to scores along each of the horizontal and vertical directions. An original resolution of the input video or images in the horizontal and vertical directions is identified according to the scores.

In one or more illustrative examples, a system for detecting scaling of compressed videos or images is provided. The system includes a computing device programmed to apply a frequency domain transformation along both horizontal and vertical directions of input video or images to generate frequency domain data; compute statistics in the frequency domain data for each of the horizontal and vertical directions to extract features; model the features to scores along each of the horizontal and vertical directions; and identify an original resolution of the input video or images in the horizontal and vertical directions according to the scores.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
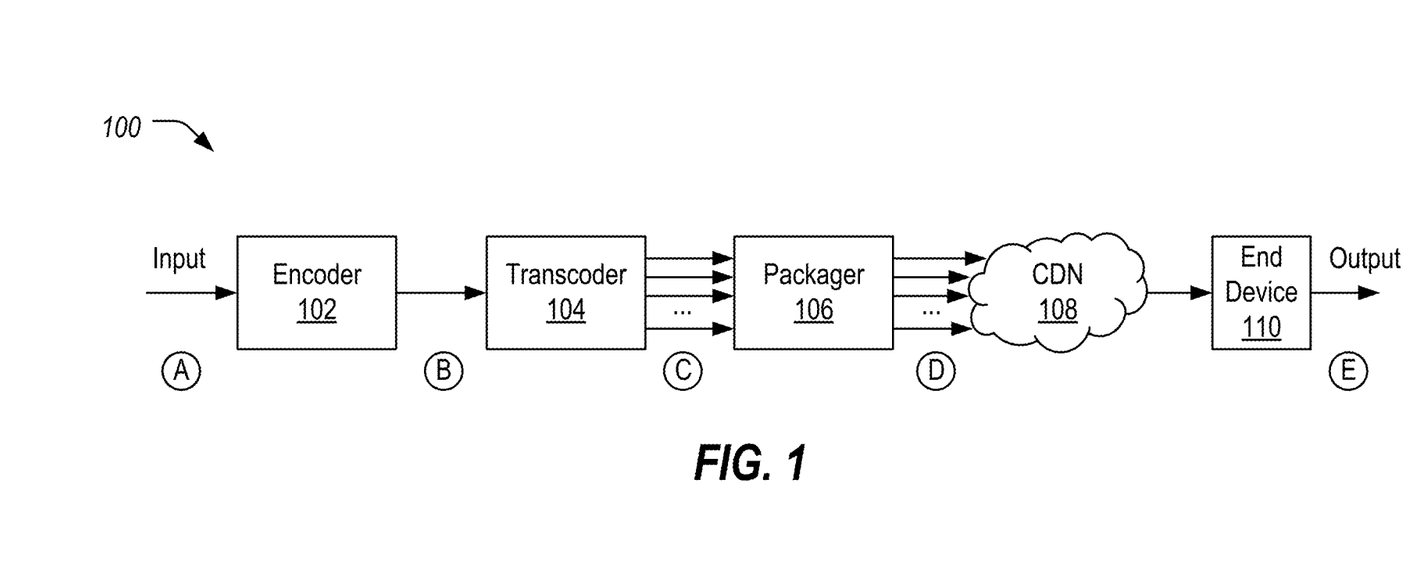
FIG. 1 illustrates an example video transmission pipeline, in accordance with an example embodiment of the disclosure.

FIG. 1 illustrates an example video transmission pipeline 100, in accordance with an example embodiment of the disclosure. In the illustrated example, the transmission pipeline 100 includes a sequence of one or more encoders 102, transcoders 104, packagers 106, content delivery networks (CDNs) 108, and home viewing/end user devices 110. The source video feed may be in various video formats, for example, Serial digital interface (SDI), transport stream, multicast Internet Protocol (IP), or mezzanine files from content producers/providers. For home TV, the end user devices 110 are often set-top boxes that replay the received video streams to TV, e.g. through High-Definition Multimedia Interface (HDMI) cables. Each of the devices along the transmission pipeline 100 may perform operations that involve video quality degradations and latencies. These operations may include compression and rescaling of the video stream.

An instance of video content may include, as some examples, a live video feed from a current event, a prerecorded show or movie, and/or an advertisement or other clip to be inserted into another video feed. The video content may include just video in some examples, but in many cases the video further includes additional content such as audio, subtitles, and metadata information descriptive of the content and/or format of the video. In general, the video transmission pipeline 100 includes one or more sources of instances of video content, as shown at point (A).

The one or more encoders 102 may receive the video content from the sources. The encoders 102 may be located at a head-end of the video transmission pipeline 100. The encoders 102 may include electronic circuits and/or software configured to compress the video content into a format that conforms with one or more standard video compression specifications. This compressed video content is shown at point (B). Examples of video encoding formats include MPEG-2 Part 2, MPEG-4 Part 2, H.264 (MPEG-4 Part 10), HEVC, Theora, RealVideo RV40, VP9, and AV1. In many cases, the compressed video lacks some information present in the original video, which is referred to as lossy compression. A consequence of this is that decompressed video may have a lower quality than the original, uncompressed video.

The one or more transcoders 104 may receive the encoded video content from the encoders 102. The transcoders 104 may include electronic circuits and/or software configured to re-encode the video content from a source format, resolution, and/or bit depth into an instance of video content with a different format, resolution, and/or bit depth. In many examples, the transcoders 104 may be used to create, for each received instance of video content, a set of time-aligned video streams, each with a different bitrate and frame size. This set of video steams is shown at point (C) and may be referred to as a ladder or compression ladder. It may be useful to have different versions of the same video streams in the ladder, as downstream users may have different bandwidth, screen size, or other constraints. In some cases, the transcoders 104 may be integrated into the encoders 102, but in other examples the encoders 102 and transcoders 104 are separate components.

The one or more packagers 106 may have access to the ladders for each of the instances of video content. The packagers 106 may include hardware and/or software configured to create segmented video files to be delivered to clients that then stitch the segments together to form a contiguous video stream. As shown at point (D), the segmented video may include video fragments, as well as a manifest that indicates how to combine the fragments. The packager 106 may sometimes be integrated into the encoder 102 and/or transcoder 104 that first creates the digital encoding of the instance of video content, but often it is a separate component. In one example, the transcoders 104 and packagers 106 may be located in a media data center between the head-end and the content delivery network 108.

The packagers 106 may provide the packaged video content to one or more origins to the content delivery network 108. The origins refer to a location of the content delivery network 108 to which video content enters the content delivery network 108. In some cases, the packagers 106 serve as origins to the content delivery network 108, while in other cases, the packagers 106 push the video fragments and manifests into the origins. The content delivery network 108 may include a geographically-distributed network of servers and data centers configured to provide the video content from the origins to destination end user devices 110. The end user devices 110 may include, as some examples, set-top boxes connected to televisions or other video screens, tablet computing devices, and/or mobile phones. Notably, these varied end user devices 110 may have different viewing conditions (including illumination and viewing distance, etc.), spatial resolution (e.g., SD, HD, full-HD, UHD, 4K, etc.), frame rate (15, 24, 30, 60, 120 frames per second, etc.), dynamic range (8 bits, 10 bits, and 12 bits per pixel per color, etc.). The end user device 110 may execute a video player to play back the video content received to the end user devices 110 from the content delivery network 108.

The video content may differ in video profile (e.g., codec, codec profile, codec level, resolution, frame rate, etc.) and in bitrate range along the stream transmission pipeline. For instance, at point (A) before the encoder 102, the video may be in a format such as ProRes/MPEG2/JPEG 2000, with a bitrate range such as between 100 Mbps-200 Mbps. At point (B), after the encoder 102 and before the transcoder 104, the video may be in a format such as MPEG2, with a bitrate range of 20 Mbps-50 Mbps. At point (C), after the transcoder 104 but before the packager 106, the video may be in a format such as H.264/HEVC, with a bitrate range between 500 Kbps-3.6 Mbps. At point (D), after the packager 106 and at entry to the content delivery network 108, the video may be segmented and encrypted H.264/HEVC, also with a bitrate range between 500 Kbps-3.6 Mbps. At point (E), after receipt and decoding by the end user device 110, the video may be in a format such as 1080p or 720p, provided to a display via an HDMI output of the end user device 110.

Aspects of the disclosure generally relate to automated detection of the resolution from which a compressed video or a compressed image is scaled up. As discussed in detail herein, the described approval uses pixel information without any metadata to detect the resolution from which a video or an image is upscaled. For instance, the pixel information at the outputs of Point (E) may be utilized.

Objective Quality-of-Experience (QoE) scores may be computed at various points along the stream transmission pipeline (e.g., the Points A through E). QoE of a video, as used herein, relates to mapping human perceptual QoE onto an objective scale, i.e., the average score given by human subjects when expressing their visual QoE when watching the playback of a video content. For example, a score may be defined on a scale of 0-100, which can be evenly divided to five quality ranges of bad (0-19), poor (20-39), fair (40-59), good (60-79), and excellent (80-100), respectively. One example objective QoE score is the SSIMPLUS score. Existing image or video QoE measurements applied on the outputs at Point (E) do not detect scaling impairments introduced by the scaling process. As this impact of the scaling impairments to the QoE scores may not be measured, the scaling may unaccounted for in the determination of the QoE score. This may therefore produce a significant QoE prediction bias, reducing the comparability of QoE scores across different profiles. Accordingly, identifying the pre-scaled resolution may be useful in determining end user QoE, such as where a set-top box (STB) upscales an SD video to HD (720p) or FHD (1080p).

Spatial information refers to aspects of the information within a frame, such as textures, highlights, etc. Temporal information refers to aspects of the information between frames, such as motion or other differences between frames. In video encoding, the more complex the spatial and temporal content of the video, or even a specific title, scene, frame, the worse the quality of encoded video will be perceived to a viewer when the same amount of bitrate is used during the encoding. However, encoding the video using a higher bitrate may require additional bandwidth to transmit the video. One solution is to use an encoding ladder to produce multiple different encodes of the content. The ladder may include several encoding configurations or profiles outlining a spectrum of bitrate/resolution combinations used to encode video content. In some cases, multiple adaptive bitrate (ABR) ladders may be used for the same content, for example for different input stream quality levels (e.g., low quality, high quality, etc.), for different output stream quality levels (e.g., low quality service, high quality premium service, etc.), for supporting end user devices that use different decoders, for different output resolutions (e.g., 144p, 240p, 360p, 480p, 720p, 1080p), etc. An encoder or transcoder may create, for each received instance of video content, a set of time-aligned video streams, each having a different bitrate and resolution according to the ladder. A user may then choose among the available ladder encodings based on bandwidth or other device requirements. In some instances, when performing ABR streaming, the STB may select a low profile (with low resolution) and up-scale the received video to HD (720p) or FHD (1080p) before sending it to the TV.

As discussed in detail herein, a scaling of the content may be detected and used for various purposes, including, for instance (i) to determine the original resolution of a video or an image before scaling up, (ii) to detect the profile switches in ABR delivery pipelines, and/or (iii) to improve the accuracy of Single-Ended QoE scoring on the STB outputs (e.g., as the resultant video at the end user device 110 may be outside of the data gathering aspects of the video transmission pipeline 100 and therefore unavailable for analysis).

Figure 2:
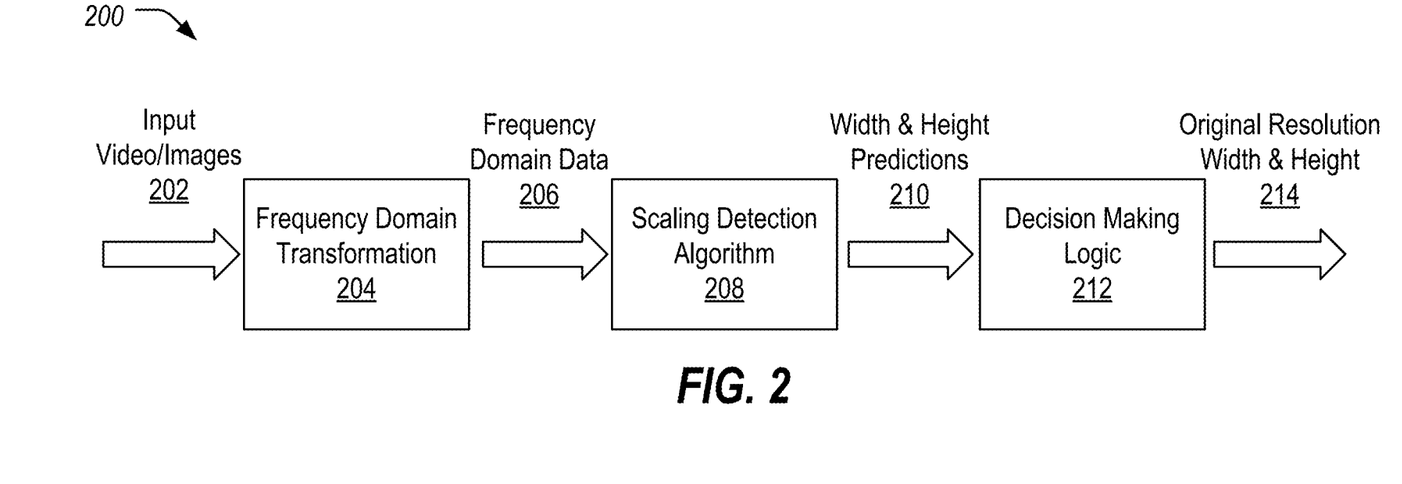
FIG. 2 illustrates an example pipeline of a scaling detection algorithm for automated detection of the original resolution of a video or image.

FIG. 2 illustrates an example pipeline 200 of a scaling detection algorithm for automated detection of the original resolution of a video or image. As shown, a frequency domain transformation 204 receives input video or images 202, which are processed into frequency domain data 206. A scaling detection algorithm 208 is applied to the frequency domain data 206 to determine width and height predictions 210. For uncompressed images and videos, the scaling detection algorithm 208 could be implemented as finding zero crossings in the frequency domain data 206. However, this may not be adequate for compressed images and videos, as compression the process adds additional frequency domain zero crossings to the data 206. Accordingly, the scaling detection algorithm 208 utilizes special characteristics in the frequency domain of the up-scaled image or frame data via a multi-stage algorithm to distinguish artifacts due to compression from spikes caused by the up-scaling. As described in further detail herein, a mathematical scoring and penalties function may be used to identify the largest spikes due to the up-scaling. These width and height predictions 210 are processed by decision-making logic 212 to identify the original width and height 214 of the input video or images 202.

Figure 3:
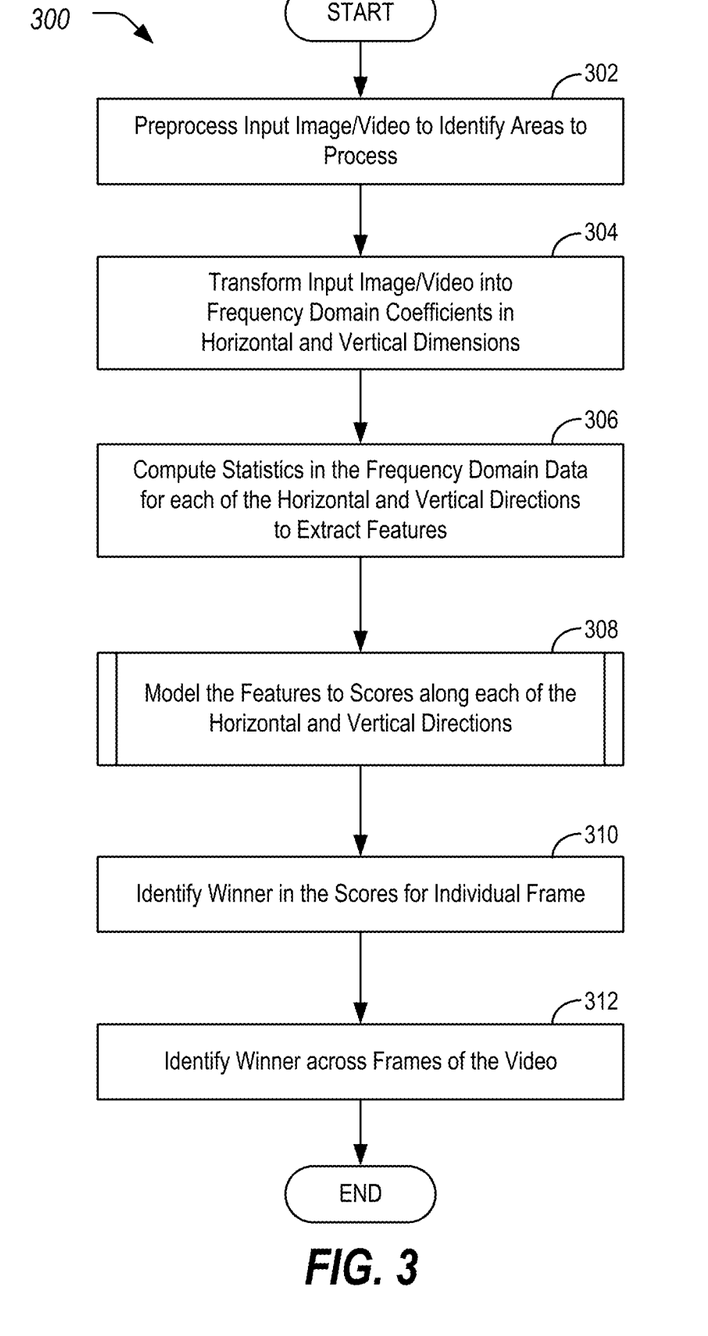
FIG. 3 illustrates an example process for the performance of the scaling detection algorithm shown in FIG. 2.

FIG. 3 illustrates an example process 300 for the performance of the scaling detection algorithm shown in FIG. 2. In an example, the scaling detection algorithm may be performed on the video stream at point (E) of the video transmission pipeline 100. As some other examples, the scaling detection algorithm may be performed on the video stream at another point along the video transmission pipeline 100, on a video stream independent of the video transmission pipeline 100, or on still image data.

At operation 302, the input video or images 202 is preprocessed to identify one or more areas of the input video or images 202 to process. In an example, the content of the input video or images 202 may be analyzed to identify whether the content includes lines to be excluded from the analysis. For instance, some content may include additional horizontal and/or vertical lines. These additional lines may serve as a buffer for the actual content, and/or to allow cropping to occur within the video transmission pipeline 100. In such a case, to process the content at its actual scaled resolution, these additional lines may be cropped off the input video or images 202 before continuing the processing.

As another possibility, in some instances content may not match the resolution or aspect ratio of the input video or images 202. This may result in letterboxing, where empty rows occur on the top and bottom of content (e.g., when 2.39:1 aspect ratio films are displayed on 1.78:1 aspect ratio screens). Or, this may result in pillarboxing on the left and right (e.g., when 4:3 content is displayed on a widescreen aspect ratio device). Or, this may result in windowboxing in which the content appears centered in a screen, with blank space on all four sides of the image. In any of these instances where the image is scaled first and the borders added afterward, the border is not scaled the same as the rest of the image, which may cause the analysis described herein to yield undesirable results. To address this, the letterboxing, pillarboxing, and/or windowboxing may be detected and cropped from the input video or images 202 as a preprocessing step.

The regions to crop may be identified as border regions all of a same color (e.g., black, but could be another color in other instances). In another example, the region to crop may be identified as a region surrounding the content that is lacking in texture (e.g., failing to meet a minimum threshold difference in pixel intensity or other spatial characteristics). In yet a further example, the input video or images 202 may always be cropped, regardless of detection, as the cropped image or video should still provide substantially the same result.

If the image or video is cropped, the processing may be applied to the subset of rows or columns of the input video or images 202. Additionally a sub-sampling ratio for the subset of rows or columns of the input video or images 202 may be calculated. This may be used to identify a scaling factor for identifying the original resolution, despite the processing being performed on only the subset of rows or columns of the input video or images 202. For instance, at the conclusion of processing, the original resolution for the subset of rows or columns may be normalized by the sub-sampling ratio for the subset of rows or columns.

At operation 304, the input video or images 202, as preprocessed, is transformed into the frequency domain data 206. This may be done in both the horizontal and vertical dimensions, to allow for analysis of the scaling of X and Y dimensions of the input video or images 202. As some non-limiting examples, this processing may include applying one-dimensional or two-dimensional Discrete Cosine Transformations (DCT) or Fast Fourier Transforms (FFT) to the input video or images 202. This may accordingly generate DCT coefficients or FFT coefficients for further processing.

At operation 306, statistics are computed in the frequency domain data 206 for each of the horizontal and vertical directions to extract features. For instance, for DCT this involves computation of the mean of absolute DCT coefficients both horizontally and vertically (e.g., to determine a distribution of absolute values of DCT coefficients across the range of possible values). These means may be denoted as follows:

$$H = [h_1, h_2, \ldots, h_x];$$
$$V = [v_1, v_2, \ldots, h_y]$$

where:
H is the horizontal mean of the coefficients of the frequency domain data 206;

V is the vertical mean of the coefficients of the frequency domain data 206;

x is the horizontal resolution (width) of the input video or images 202;

y is the vertical resolution (height) of the input video or images 202;

$h_i$ is the horizontal coefficient for the $i^{th}$ row of the frequency domain data 206; and $v_i$ is the horizontal coefficient for the $i^{th}$ column of the frequency domain data 206.

At operation 308, the output of operation 306 is searched for the largest values for each dimension, distinguishing between spikes due to compression and spikes due to up-scaling, to create finalists for identifying the original width and height 214 of the input video or images 202. To do so, a scoring function S is applied to the horizontal and vertical dimensions of the frequency domain data 206 to model the features into scores alone each of the horizontal and vertical dimensions. Further aspects of this processing are performed by the scaling detection algorithm 208, as discussed with respect to FIG. 4. It should be noted that many video compression encoders, such as MPEG2, H.264 and HEVC, generate similar spikes as an upscaling algorithm. Thus, simply picking a largest spike up may result in mis-detection. Accordingly, the process 300 utilizes a multi-stage approach to identify a spike generated by scaling and not by other processing is described.

Figure 4:
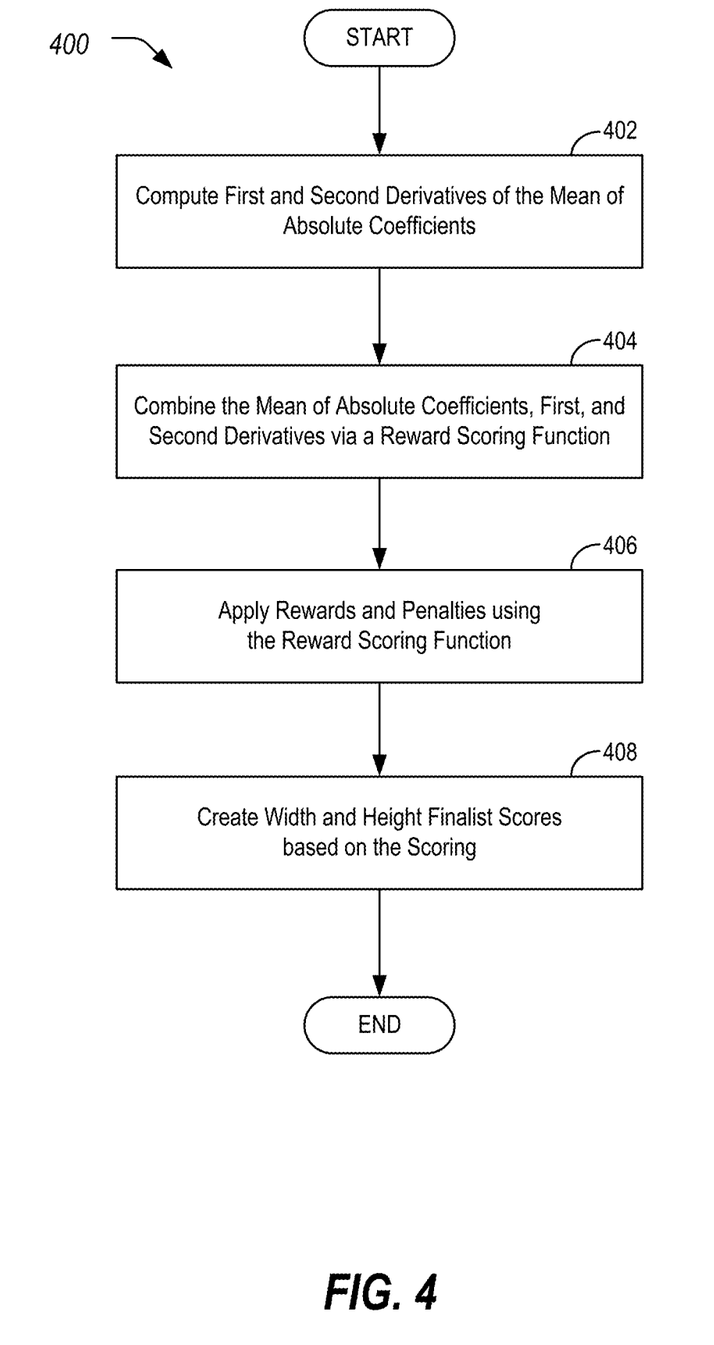
FIG. 4 illustrates an example detail of aspects of the process of FIG. 3 with respect to identifying finalists for the original width and height of the input video or images.

Referring to the subprocess 400 of FIG. 4, at operation 402 the first and second derivatives of the frequency domain data 206 are computed. For instance, in the case of DCT, this may include the first and second derivatives of the mean of the absolute DCT coefficients in the horizontal and vertical directions. These derivatives may be denoted herein as denoted as: H' for the first derivative of the horizontal mean H, H'' for the second derivative of the horizontal mean H, V' for the first derivative of the vertical mean V, and V'' for the second derivative of the vertical mean V.

At operation 404, the mean coefficients H and V, as well as the first and the second derivatives H', H'', V', and V'' are combined using a reward scoring function S, as follows:

$$S(H) = a*f(H) + b*g(H') + c*l(H'');$$
$$S(V) = a*f(V) + b*g(V') + c*l(V'')$$

where:

a is a reward scaling constant for the mean of absolute coefficients H and V;

b is a reward scaling constant for the first derivative H' and V';

c is a reward scaling constant for the second derivative H'' and V'';

f is a function of H and V;

g is a function of H' and V';

l is a function of H'' and V'';

S(H) is a score for the horizontal dimension; and

S(V) is a score for the vertical dimension.

This scoring function S may accordingly be used by the scaling detection algorithm 208 to mathematically define which are the largest spikes in the frequency domain data 206 that are due to up-scaling.

At operation 406, additional rewards and penalties are applied to the scoring function S. These additional rewards and penalties may be applied to prefer certain features of the mean of absolute coefficients, first derivatives, and second derivatives. These rewards and penalties may include, as some examples, to skip the odd positions (as such resolutions are unlikely), or give extra rewards or penalties for some special positions, as follows:

$$S(H) = P(a*f(H) + b*g(H') + c*l(H''));$$
$$S(V) = P(a*f(V) + b*g(V') + c*l(V''))$$

where:

P is a function accounting for the operations performed to apply the rewards and penalties.

At operation 408, original width and height 214 finalist scores are computed based on the scoring. Based on the overall scores, positions with their scores larger than a given threshold T may be filtered out, and finalists for the width and height may be determined separately. The threshold T may be determined empirically. These finalists may be denoted as $F_w$ and $F_h$, and their corresponding scores may be referred to as $S_w$ and $S_h$.

Referring back to FIG. 3, at operation 310 a decision is made on the image (if the input video or images 202 is an image) or on the signal frame of the video being processed (if the input video or images 202 is a video). This decision may be made, e.g., by the decision-making logic 212, by utilizing a joint scoring for each combination of width in $F_w$ and height in $F_h$, where a direct average ($S_w+S_h$) is computed. For instance, the combination having the highest score for width and the highest score for height may be offered as the resolution from which the input video or images 202 was scaled up.

Additional checking list procedures may also be performed by the decision-making logic 212 to improve accuracy of the decision. These checking list procedures may include one or more of: (i) checking common widths, heights, and their combinations and assign them different rewards, such that more common resolutions are selected for; (ii) checking and penalizing an aspect ratio change, as a change in aspect ratio may be less likely than a scaling maintaining the aspect ratio; (iii) giving small tolerance when predictions are very close to display resolution, as such predictions are unlikely; and/or (iv) abandoning both dimensions when one of the dimensions is the same as the display resolution, predicting that the resolution is not detectably scaled up.

At operation 312, in the case where the input video or images 202 is a video, a decision is made by the decision-making logic 212 on the video or sequence (of the video) level. For instance, a smoothing algorithm may be applied by a majority voting rule within the neighboring frames to identify the original width and height 214 of the input video or images 202. Additionally or alternatively, a temporal pooling may be applied by a majority voting rule with all frames of the input video or images 202 to determine the original width and height 214 of the input video or images 202. After operation 312, the process 300 ends.

Variations on the process 300 are possible. As an example, the preprocessing at operation 302 may result in the detection of multiple areas to independently process. For instance, the preprocessing may identify one or more regions having at least a minimum of spatial texture, and each of those regions may be separately analyzed using the operations 304-310 discussed herein. This may include applying a frequency domain transformation to a plurality of subsets of rows or columns of the input video or images, calculating corresponding sub-sampling ratios for each of the plurality of subsets of rows or columns, detecting, according to the sub-sampling ratios, scaling factors for identifying the original resolution for each of the plurality of subsets of rows or columns of the input video or images, and normalizing the original resolution for each of the plurality of subsets of rows or columns, as detected, by the corresponding sub-sampling ratio for the respective subset of rows or columns. As a non-limiting example of normalization, a frame resolution of an image may be 3840×2160, and 25 non-overlapped sub-frames of the image may be divided out for processing, each with a resolution of 768×432 (e.g., a sub-sampling ratio of 5). Without loss of generality, for each sub-frame, the original resolution of each sub-frame may be identified as being 384×216. Thus, the original resolution of the whole frame may be normalized out as 384×5 by 216×5=1920×1080.

Additionally, with respect to each of these original resolution results, different pooling strategies may be applied (e.g., direct averaging or weighted averaging) to make a final decision on the original width and height 214. For instance, the weighted averaging may include identifying weights for each of the original resolution results, and weighting the results according to those weights. The weights for each of the original resolution results may be determinized, as some examples, using techniques including one or more of: distortion/quality based weighting, entropy/information based weighting, saliency/visual attention based weighting.

If the image or frame contents exhibit high spatial variance, the region-based scaling detection results may differ significantly, e.g., between completely black or high texture regions. In such instances, spatial pooling may be performed to make a frame level decision. As noted, different weighting strategies could be applied adaptively, such as distortion/quality based weighting, entropy/information based weighting, and/or saliency/visual attention-based weighting. For instance, if the detection results from black regions and texture regions are compared, using an entropy/information based weighting, the results from the texture regions may be weighted more heavily in the determination. As another example, if the detection results from slightly-compressed regions and heavy-compressed regions are compared, based on the distortion/quality based weighting the results from the slightly-compressed regions may be given a greater weight in the frame level decision.

In another example, the input video or images 202 may be categorized into one category of a plurality of categories, where the reward scoring function, the checking list procedures, or both may be varied or customized according to the identified category. These categories include, for example, a set of codec types, a set of display resolutions, or a set of aspect ratios. Thus, the reward scoring function and the checking list procedures may vary according to codec, display resolution, and/or aspect ratio. This may allow for fine-tuning of the reward scoring function and the checking list procedures to the specific category of image or video being analyzed.

In yet a further example, the input video or images 202 may be decomposed into a plurality of decompositions, where, for each of the decompositions, the reward scoring function, the checking list procedures, or both may be varied or customized according to the individual decomposition. These decompositions of the overall input video or images 202 may include, for instance, a plurality of different groups of frames, a plurality of different content types (e.g., sports, news, cartoons, etc.), a plurality of different distortion types (e.g., noise, blurriness, blockiness, macroblocking, etc.), a plurality of different complexity levels (e.g., the inverse of QoE score, a measure of spatial and/or temporal features of the content, image feature extraction and mathematical modeling, etc.), or a plurality of different QoE quality levels (e.g., bad (0-19), poor (20-39), fair (40-59), good (60-79), and excellent (80-100), as one possible set).

Figure 5:
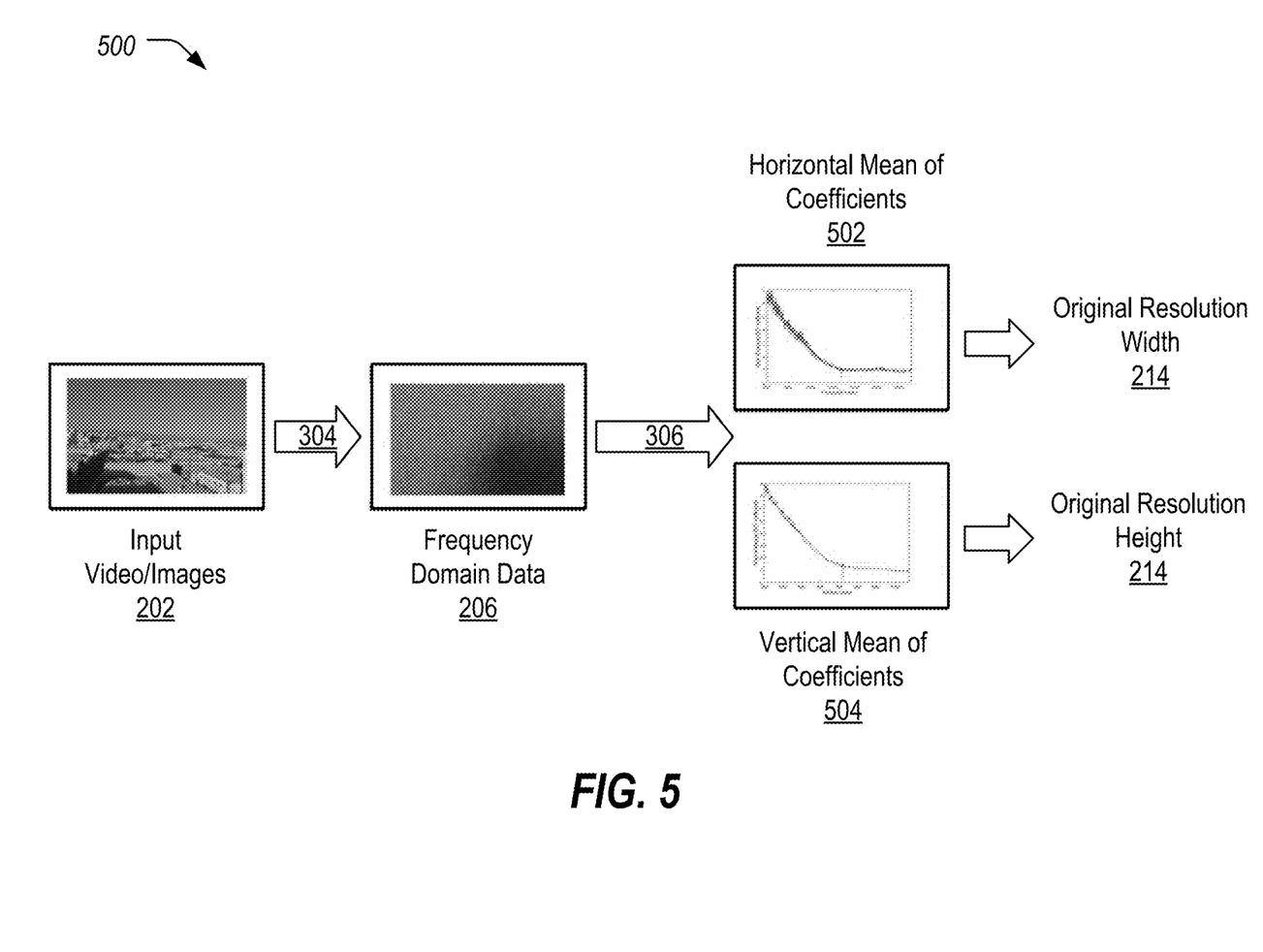
FIG. 5 illustrates an example use of the scaling detection algorithm described in FIGS. 3 and 4.

FIG. 5 illustrates an example use 500 of the scaling detection algorithm described in FIGS. 3 and 4. As shown, an example input video or image 202 is provided. This input video or images 202 is transformed into the frequency domain data 206 for processing, as discussed with respect to operation 304. For instance, DCT may be performed on the input video or image 202, in both the horizontal and vertical directions, resulting in the frequency domain data 206 in the form of DCT spectrum.

Next, as described with respect to operation 306, the mean of the coefficients of the frequency domain data 206 is projected. For instance, for DCT this involve computation of the horizontal mean of absolute DCT coefficients 502 and computation of the vertical mean of absolute DCT coefficients 504. The original resolution width 214 may be determined from the horizontal mean of absolute DCT coefficients 502, and the original resolution height 214 may be determined from the vertical mean of absolute DCT coefficients 504, as described above with respect to operations 308-312. Notably, while shown as separate determinations, the additional rewards and penalties may involve procedures that involve both horizontal and vertical dimensions, such as with respect to preferring maintaining the aspect ratio and/or with respect to preferring common resolutions (e.g., 1920×1080, 1280×720, 960×720, 640×360, etc.).

Figure 6:
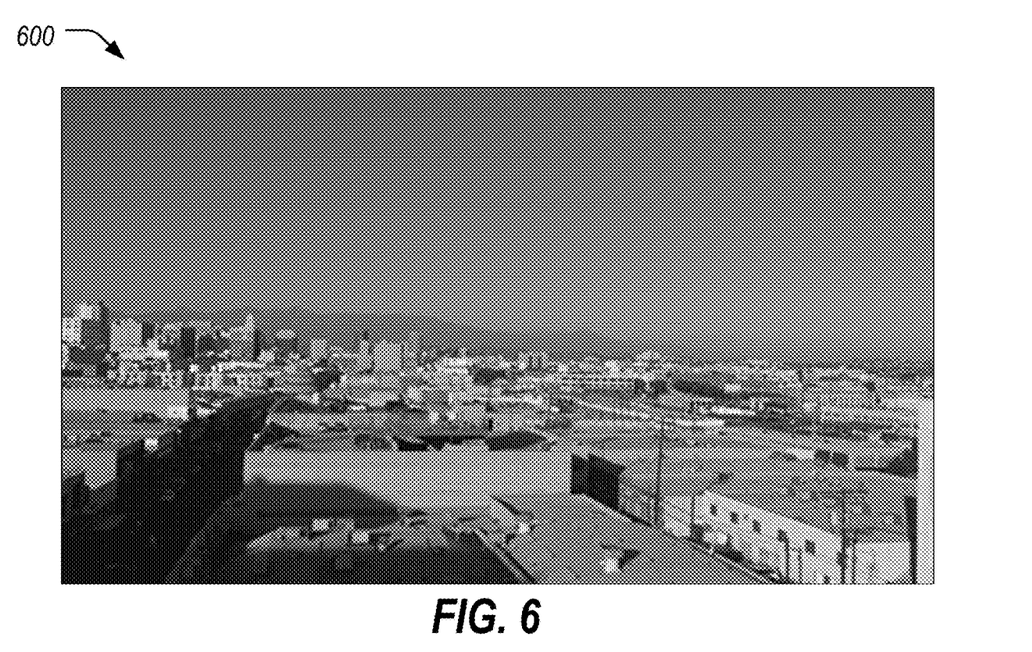
FIG. 6 illustrates an example of an input video or image as a true 1080p image.
Figure 7:
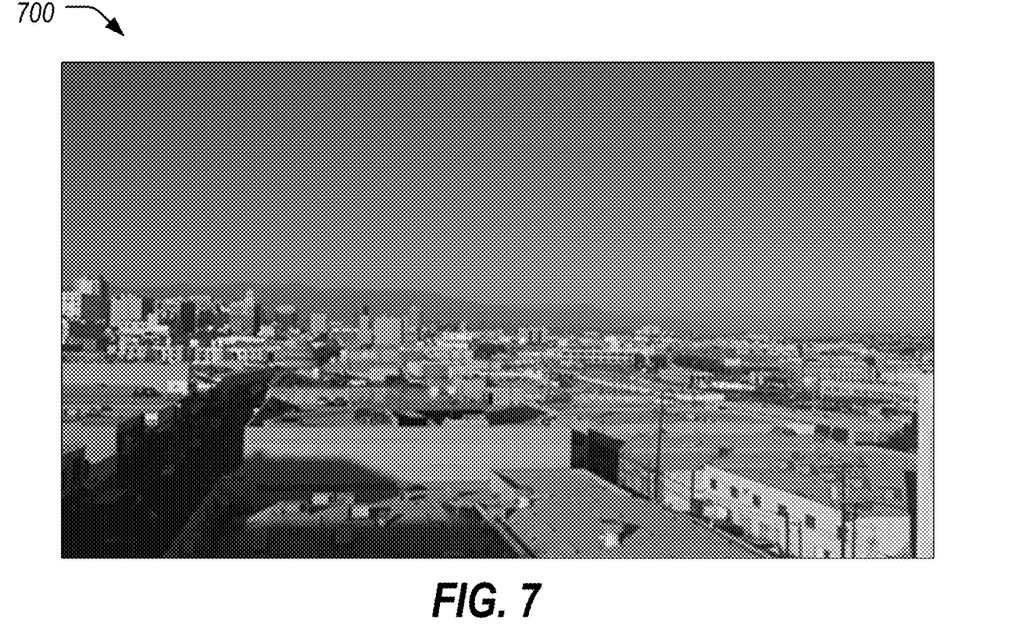
FIG. 7 illustrates an example of the input video or image as a 720p image that was upscaled to a 1080p format.

FIG. 6 illustrates an example of an input video or image 202 as a true 1080p image 600. FIG. 7 illustrates an example of the input video or image 202 as a 720p image 700 that was upscaled to a 1080p format. As shown, there is some additional detail in certain regions in the 1080p image 600 as compared to the upscaled 720p image 700. Nevertheless, it may be difficult to discern that the original resolution of the image 700 in FIG. 7 is 720p and not some other resolution.

Figure 8:
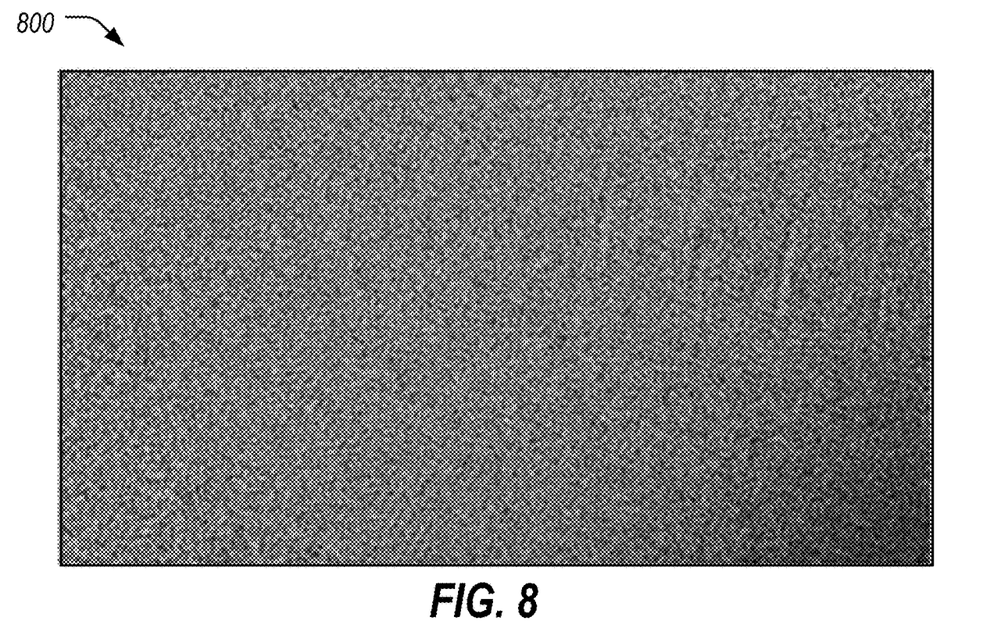
FIG. 8 illustrates an example of DCT spectrum of the true 1080p image of FIG. 6.
Figure 9:
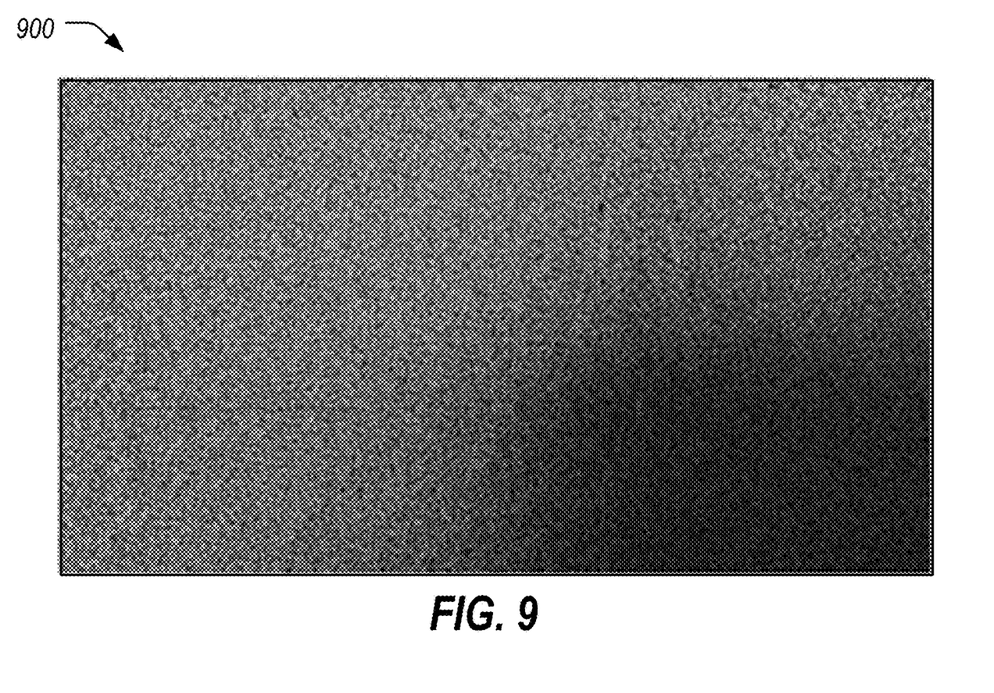
FIG. 9 illustrates an example of DCT spectrum of the upscaled 720p image of FIG. 7.

FIG. 8 illustrates an example of DCT spectrum 800 of the true 1080p image 600 of FIG. 6. FIG. 9 illustrates an example of a DCT spectrum 900 of the upscaled 720p image 700 of FIG. 7. As can be seen in comparison, there is a reduction in detail in evident in the DCT spectrum 900 as compared to that of the DCT spectrum 800, especially in the lower right quadrant of the DCT spectrum 900.

Figure 10:
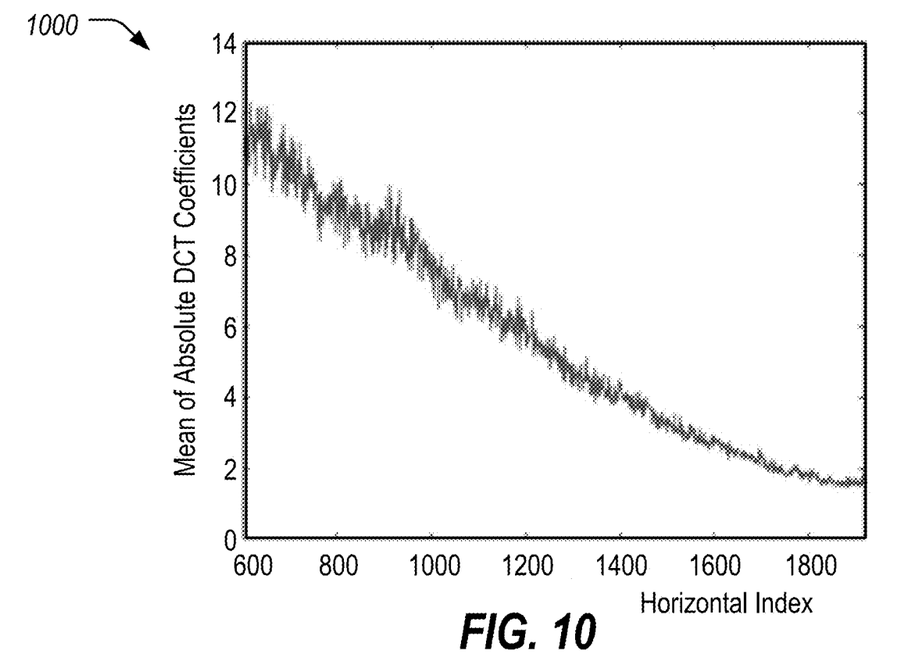
FIG. 10 illustrates an example of the horizontal mean of coefficients for the DCT spectrum of FIG. 8 of the true 1080p image of FIG. 6.
Figure 11:
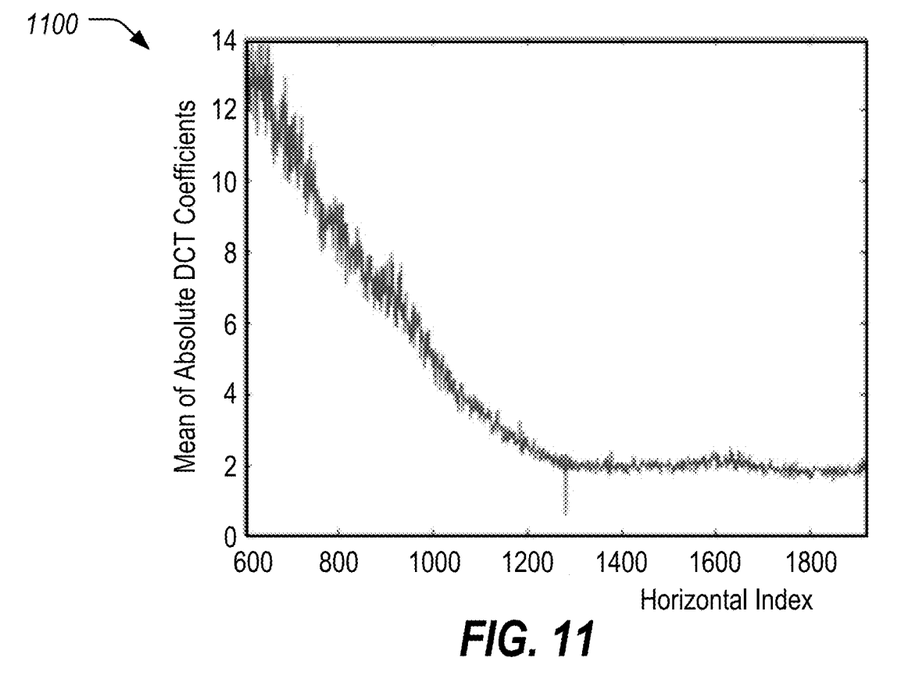
FIG. 11 illustrates an example of the horizontal mean of coefficients for the DCT spectrum of FIG. 9 of the upscaled 720p image of FIG. 7.
Figure 12:
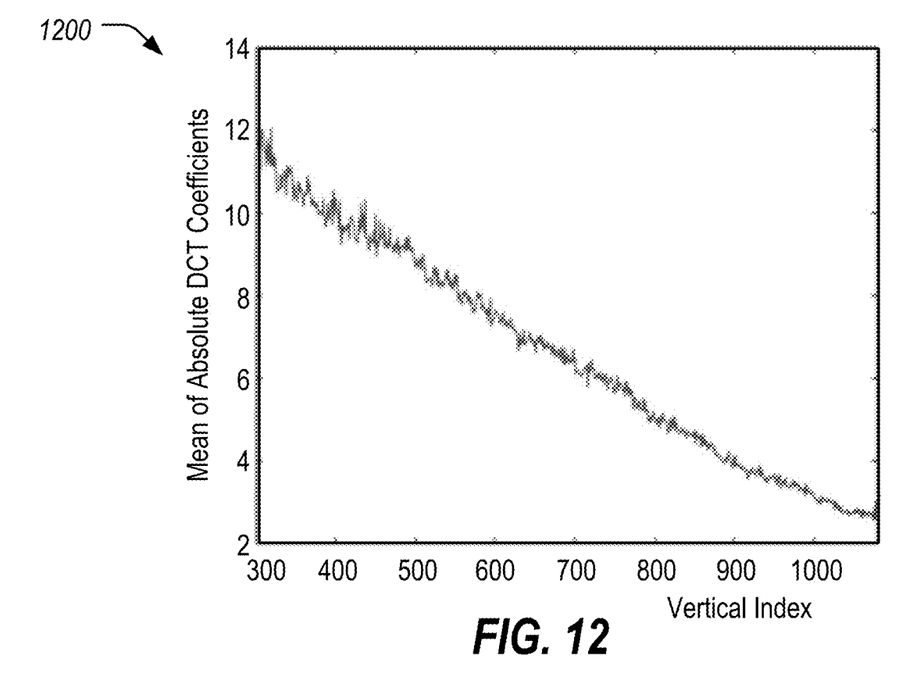
FIG. 12 illustrates an example of the vertical mean of coefficients for the DCT spectrum of FIG. 8 of the true 1080p image of FIG. 6.
Figure 13:
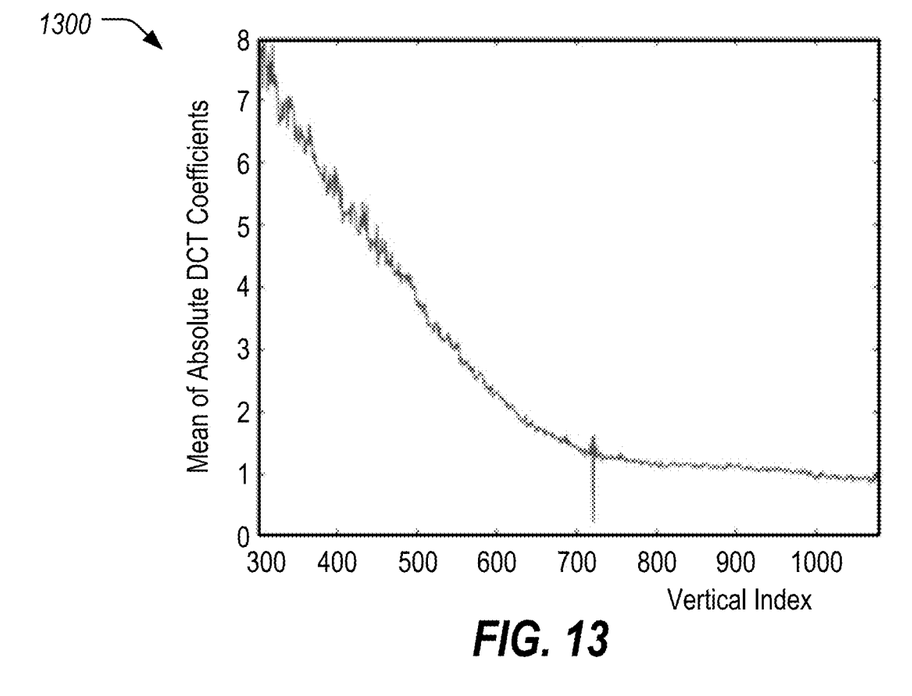
FIG. 13 illustrates an example of the vertical mean of coefficients for the DCT spectrum of FIG. 9 of the upscaled 720p image of FIG. 7.

FIG. 10 illustrates an example of the horizontal mean of coefficients 502 for the DCT spectrum 800 of FIG. 8 of the true 1080p image 600 of FIG. 6. FIG. 11 illustrates an example of the horizontal mean of coefficients 502 for the DCT spectrum 900 of FIG. 9 of the upscaled 720p image 700 of FIG. 7. FIG. 12 illustrates an example of the vertical mean of coefficients 504 for the DCT spectrum 800 of FIG. 8 of the true 1080p image 600 of FIG. 6. FIG. 13 illustrates an example of the vertical mean of coefficients 504 for the DCT spectrum 900 of FIG. 9 of the upscaled 720p image 700 of FIG. 7. Here, it can be seen that in FIGS. 10 and 12 with the true 1080p image, there are no major spikes in either the horizontal mean of coefficients 502 curve of FIG. 10 or in the vertical mean of coefficients 504 curve of FIG. 12. However, in FIGS. 11 and 13 with the upscaled 720p image 700, downhill spikes can be easily identified, where the horizontal position is 1280 in FIG. 11 and the vertical position is 720 in FIG. 13. Thus, it can be identified that the original resolution of the upscaled 720p image 700 is, as expected, 1280×720.

Accordingly, by using the described approach, detection may be performed of the original resolution width and height 214 from which a compressed video or a compressed image is scaled up. This may be used for various purposes, including, for instance (i) to determine the original resolution of a video or an image before scaling up, (ii) to detect the profile switches in ABR delivery pipelines, and/or (iii) to improve the accuracy of Single-Ended QoE scoring on the STB outputs. This may, for example, help users to obtain statistics on the effects on the encoding ladder of the content delivery network 108 and the player logic of the end user devices 110. These statistics may further aid in the optimization of the encoding ladder and/or the player logic.

Figure 14:
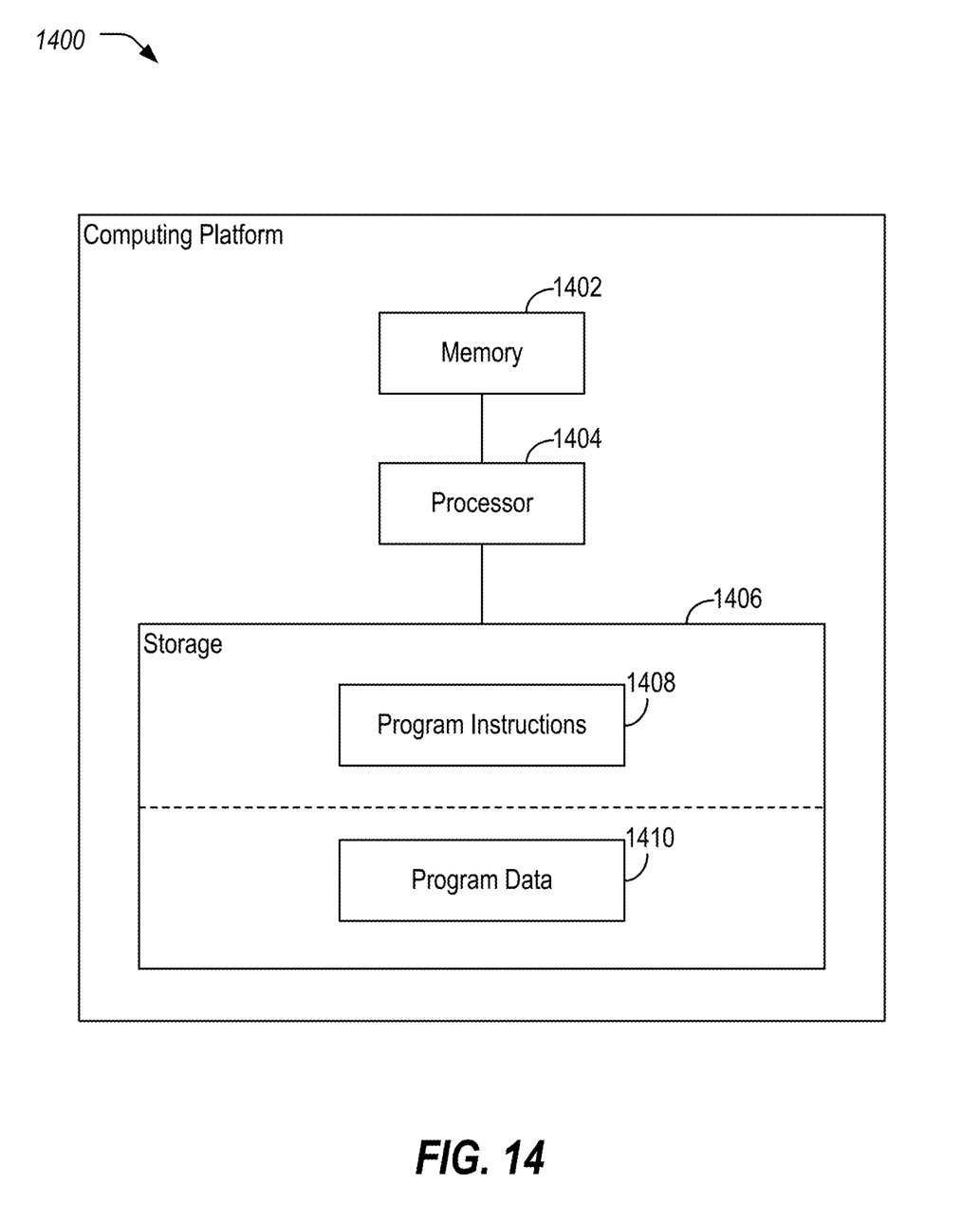
FIG. 14 illustrates an example computing device for the performance of the scaling detection algorithm for the automated detection of the resolution from which a compressed video or a compressed image is scaled up.

FIG. 14 illustrates an example computing device 1400 for the performance of the scaling detection algorithm for the automated detection of the resolution from which a compressed video or a compressed image is scaled up. The algorithms and/or methodologies of one or more embodiments discussed herein, such as those illustrated with respect to FIGS. 1-13, may be implemented using such a computing device 1400. The computing device 1400 may include memory 1402, processor 1404, and non-volatile storage 1406. The processor 1404 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 1402. The memory 1402 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 1406 may include one or more persistent data storage devices such as a hard drive, optical drive, tape drive, non-volatile solid-state device, cloud storage or any other device capable of persistently storing information.

The processor 1404 may be configured to read into memory 1402 and execute computer-executable instructions residing in program instructions 1408 of the non-volatile storage 1406 and embodying algorithms and/or methodologies of one or more embodiments. The program instructions 1408 may include operating systems and applications. The program instructions 1408 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 1404, the computer-executable instructions of the program instructions 1408 may cause the computing device 1400 to implement one or more of the algorithms and/or methodologies disclosed herein. The non-volatile storage 1406 may also include data 1410 supporting the functions, features, and processes of the one or more embodiments described herein. This data 1410 may include, as some examples, the input video or images 202, frequency domain data 206, width and height predictions 210, and the original width and height 214.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for detecting scaling of compressed videos or images, comprising:
    applying a frequency domain transformation along both horizontal and vertical directions of input video or images to generate frequency domain data, the input video or images having been scaled up from an original resolution to a scaled resolution greater than the original resolution;
    computing statistics in the frequency domain data for each of the horizontal and vertical directions to extract features;
    modeling the features to scores along each of the horizontal and vertical directions; and
    identifying the original resolution of the input video or images in the horizontal and vertical directions according to the scores.

2. The method of claim 1, wherein the frequency domain transformation includes one or more of 1D or 2D Discrete Cosine Transformation (DCT) or Fast Fourier Transform (FFT).

3. The method of claim 2, wherein the frequency domain data includes DCT coefficients formed as a DCT spectrum computed for each of the horizontal and vertical directions, and the statistics in the frequency domain data include one or more of:
    (i) a horizontal mean of absolute DCT coefficients of the DCT spectrum and a vertical mean of absolute DCT coefficients of the DCT spectrum,
    (ii) first and second derivatives of the horizontal and vertical means of the absolute DCT coefficients of the DCT spectrum, and/or
    (iii) different order statistics of the horizontal and vertical means of the absolute DCT coefficients of the DCT spectrum.

4. The method of claim 1, further comprising:
    applying the frequency domain transformation to a sub-frame including a subset of rows or columns of the input video or images and calculating a corresponding sub-sampling ratio;
    identifying the original resolution for the subset of rows or columns of the input video or images; and
    normalizing the detected sub-frame resolution by the sub-sampling ratio to determine the original resolution.

5. The method of claim 1, further comprising:
    applying the frequency domain transformation to a plurality of subsets of rows or columns of the input video or images and calculating corresponding sub-sampling ratios for each of the plurality of subsets of rows or columns;
    detecting, according to the sub-sampling ratios, scaling factors for identifying the original resolution for each of the plurality of subsets of rows or columns of the input video or images;
    normalizing the detected resolution for each of the plurality of subsets of rows or columns by the corresponding sub-sampling ratio for the respective subset of rows or columns to determine the original resolution; and
    weighting the original resolution for each of the plurality of subsets of rows or columns to determine the original resolution of the input video or images as a whole.

6. The method of claim 5, wherein the weighting includes one or more of applying a pooling strategy including one or more of direct averaging or weighted averaging to determine the original resolution of the input video or images as a whole, wherein the weighted averaging includes one or more of: distortion/quality based weighting, entropy/information based weighting, or saliency/visual attention based weighting.

7. The method of claim 1, further comprising:
    computing statistics in the frequency domain data spectrum for each of the horizontal and vertical directions, the statistics including one or more of:
    (i) a horizontal mean of absolute DCT coefficients of the DCT spectrum and a vertical mean of absolute DCT coefficients of the DCT spectrum,
    (ii) first and second derivatives of the horizontal and vertical means of the absolute DCT coefficients of the DCT spectrum, and/or
    (iii) different order statistics of the horizontal and vertical means of the absolute DCT coefficients of the DCT spectrum; and
    identifying an overall score indicative of the original resolution of the input video or images using a reward scoring function applying one or more rewards or penalties to the statistics.

8. The method of claim 7, further comprising using one or more checking list procedures to improve accuracy in determination of the original resolution, the checking list procedures including one or more of: (i) checking common widths, heights, and their combinations and assign them different rewards, such that more common resolutions are selected for; (ii) checking and penalizing an aspect ratio change, as a change in aspect ratio may be less likely than a scaling maintaining the aspect ratio; (iii) giving small tolerance when predictions are very close to display resolution; and/or (iv) abandoning both dimensions when one of the dimensions is the same as the display resolution.

9. The method of claim 8, further comprising:
categorizing the input video or images into one category of a plurality of categories; and
varying one or more of the reward scoring function or the checking list procedures according to the one category.

10. The method of claim 9, wherein the plurality of categories includes a set of codec types, a set of display resolutions, or a set of aspect ratios.

11. The method of claim 8, further comprising:
decomposing the input video or images into a plurality of decompositions; and
for each of the plurality of decompositions
using an overall scoring function corresponding to the respective decomposition, and
using a final checking list corresponding to the respective decomposition.

12. The method of claim 11, wherein the plurality of decompositions includes one or more of: a plurality of different groups of frames, a plurality of different content types, a plurality of different distortion types, a plurality of different complexity levels, or a plurality of different quality levels.

13. A system for detecting scaling of compressed videos or images, comprising:
a computing device programmed to
apply a frequency domain transformation along both horizontal and vertical directions of input video or images to generate frequency domain data, the input video or images having been scaled up from an original resolution to a scaled resolution greater than the original resolution;
compute statistics in the frequency domain data for each of the horizontal and vertical directions to extract features;
model the features to scores along each of the horizontal and vertical directions; and
identify the original resolution of the input video or images in the horizontal and vertical directions according to the scores.

14. The system of claim 13, wherein the frequency domain transformation includes one or more of 1D or 2D Discrete Cosine Transformation (DCT) or Fast Fourier Transform (FFT).

15. The system of claim 14, wherein the frequency domain data includes DCT coefficients formed as a DCT spectrum computed for each of the horizontal and vertical directions, and the statistics in the frequency domain data include one or more of:
(i) a horizontal mean of absolute DCT coefficients of the DCT spectrum and a vertical mean of absolute DCT coefficients of the DCT spectrum,
(ii) first and second derivatives of the horizontal and vertical means of the absolute DCT coefficients of the DCT spectrum,
(iii) and/or different order statistics of the horizontal and vertical means of the absolute DCT coefficients of the DCT spectrum.

16. The system of claim 13, wherein the computing device is further programmed to:
applying the frequency domain transformation to a sub-frame including a subset of rows or columns of the input video or images and calculating a corresponding sub-sampling ratio;
identify the original resolution for the subset of rows or columns of the input video or images; and
normalize the detected sub-frame resolution by the sub-sampling ratio to determine the original resolution.

17. The system of claim 13, wherein the computing device is further programmed to:
apply the frequency domain transformation to a plurality of subsets of rows or columns of the input video or images and calculating corresponding sub-sampling ratios for each of the plurality of subsets of rows or columns;
detect, according to the sub-sampling ratios, scaling factors for identifying the original resolution for each of the plurality of subsets of rows or columns of the input video or images;
normalize the detected resolution for each of the plurality of subsets of rows or columns by the corresponding sub-sampling ratio for the respective subset of rows or columns to determine the original resolution; and
weight the original resolution for each of the plurality of subsets of rows or columns to determine the original resolution of the input video or images as a whole.

18. The system of claim 17, wherein the weighting includes one or more of applying a pooling strategy including one or more of direct averaging or weighted averaging to determine the original resolution of the input video or images as a whole, wherein the weighted averaging includes one or more of: distortion/quality based weighting, entropy/information based weighting, or saliency/visual attention based weighting.

19. The system of claim 13, wherein the computing device is further programmed to:
compute statistics in the frequency domain data, the statistics including one or one or more of:
(i) a horizontal mean of absolute DCT coefficients of the DCT spectrum and a vertical mean of absolute DCT coefficients of the DCT spectrum,
(ii) first and second derivatives of the horizontal and vertical means of the absolute DCT coefficients of the DCT spectrum, and/or
(iii) different order statistics of the horizontal and vertical means of the absolute DCT coefficients of the DCT spectrum; and
identify an overall score indicative of the original resolution of the input video or images using a reward scoring function applying one or more rewards or penalties to the statistics.

20. The system of claim 19, wherein the computing device is further programmed to use one or more checking list procedures to improve accuracy in determination of the original resolution, the checking list procedures including one or more of: (i) checking common widths, heights, and their combinations and assign them different rewards, such that more common resolutions are selected for; (ii) checking and penalizing an aspect ratio change, as a change in aspect ratio may be less likely than a scaling maintaining the aspect ratio; (iii) giving small tolerance when predictions are very close to display resolution; and/or (iv) abandoning both dimensions when one of the dimensions is the same as the display resolution.

21. The system of claim 20, wherein the computing device is further programmed to:
categorize the input video or images into one category of a plurality of categories; and
vary one or more of the reward scoring function or the checking list procedures according to the one category.

22. The system of claim 21, wherein the plurality of categories includes a set of codec types, a set of display resolutions, or a set of aspect ratios.

23. The system of claim 20, wherein the computing device is further programmed to:

decompose the input video or images into a plurality of decompositions; and for each of the plurality of decompositions
use an overall scoring function corresponding to the respective decomposition, and
use a final checking list corresponding to the respective decomposition.

24. The system of claim 23, wherein the plurality of decompositions includes one or more of: a plurality of different groups of frames, a plurality of different content types, a plurality of different distortion types, a plurality of different complexity levels, or a plurality of different quality levels.

* * * * *